United States Patent [19]

Chocas

[11] 4,350,019

[45] Sep. 21, 1982

[54] GAS EXPANSION/COMPRESSION TRAIN

[75] Inventor: William Chocas, Memphis, Tenn.

[73] Assignee: W. R. Grace & Co., New York, N.Y.

[21] Appl. No.: 218,760

[22] Filed: Dec. 22, 1980

[51] Int. Cl.³ .............................................. F25D 7/00
[52] U.S. Cl. ........................................... 62/87; 62/402
[58] Field of Search ...................... 62/86, 87, 401, 402

[56] References Cited

U.S. PATENT DOCUMENTS 2,453,923 11/1948 Mayo ..................................... 62/87
2,767,561 10/1956 Seeger ................................... 62/87

Primary Examiner—Ronald C. Capossela
Attorney, Agent, or Firm—Edward J. Cabic; William W. McDowell, Jr.

[57] ABSTRACT

A stream of gas, e.g., natural gas to e.g., a reforming operation, is divided, and the two streams are interacted so as to lower the pressure and raise the temperature of one while doing the reverse to the other.

5 Claims, 1 Drawing Figure

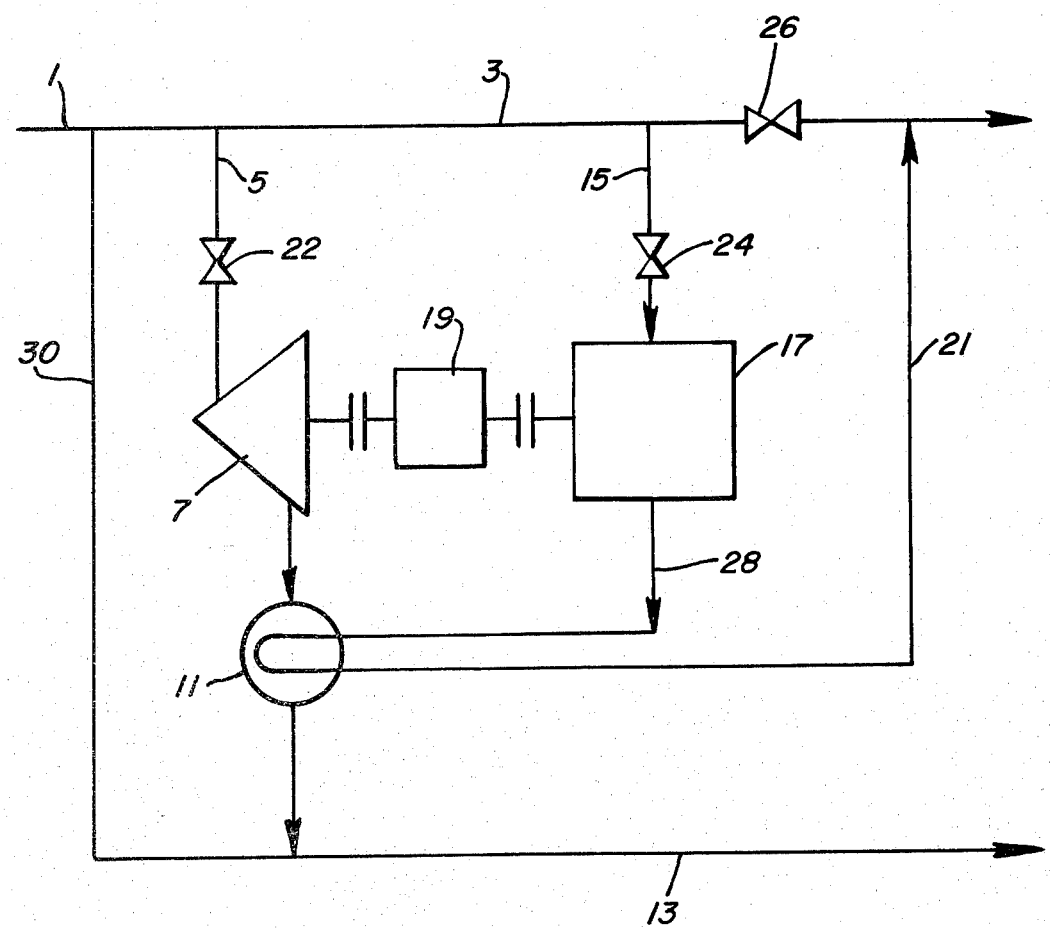

GAS EXPANSION/COMPRESSION TRAIN

This invention is applicable to any gas, part of which is required at a pressure above the supply pressure and part is required at a pressure below the supply pressure. The inventive process is particularly applicable to ammonia, methanol, and hydrogen plants using natural gas, where approximately 25-60% of the total gas usage is for fuel and the rest for feedstock.

In ammonia, methanol, and hydrogen plants natural gas is conventionally used both as a feedstock in reforming and synthesis gas operations and also as a fuel to heat the reformers and for other heat needs in the plant. It is desirable that the pressure of the feedstock be relatively high owing to pressure requirements of the various reforming and synthesis gas unit processes. For the majority of U.S. ammonia production capacity, this pressure is conventionally furnished by compressors powered by steam turbines. (Some plants have electric motor driven compressors.) By this invention, however, part of the pressure is provided by part of the pressure energy available in the initial natural gas feed, thereby saving energy. This is done by using part of the initial feed to run a turbine-compressor to compress a second part of the feed. This cools the first stream and heats the second. In a preferred embodiment both are then passed through a heat exchanger where the second stream is cooled by the first. The first stream is now the fuel stream (at higher temperature than the expander discharge and lower pressure than the initial natural gas); and the second stream is the feedstock stream (at a higher pressure than the initial natural gas and a lower temperature than the compressor discharge). The lower temperature is important in this stream, because it causes a reduced volume, which requires less power for subsequent compression. Since the temperature of the fuel stream is increased, this also saves energy, because the available BTU's in this stream are increased.

The FIGURE shows a schematic flow sheet employing the invention. In this flow diagram the details are given for a natural gas feed to an ammonia plant. This is simply by way of example. The process works with any gas, e.g., air, carbon dioxide, nitrogen, and the like. Also, the heat exchange operation can be omitted altogether and lines 9 and 28 can serve as the two product lines of the process, line 9 being at a lower pressure than initial stream 1, and line 28 being at a higher pressure.

Referring now to the drawing, at 1 is shown the inlet pipe for natural gas, typically entering at 200 psig and 60° F. In this case the feed rate was 5100 moles per hour (MPH). This line branches into two streams, namely stream 3 for feedstock and stream 5 for fuel gas. The fuel gas stream at 2300 MPH feeds to expander turbine 7, typically operated at 4000 rpm and 500 HP. The exhaust from turbine 7 proceeds via line 9 at −10° F. to heat exchanger 11, of 900 square feet surface area and a capacity of 1,600,000 BUT/HR. Effluent from heat exchanger 11 proceeds through line 13 to provide fuel gas at about 50 psig and 75° F., and 2300 MPH to the fuel gas header (not shown) for use throughout the plant. Returning now to line 3, this carries natural gas to be used as feedstock in the plant, at about 2800 MPH. It is still at 200 psig and 60° F. It passes through line 15 to compressor 17, running at 1000 rpm. Compressor 17 is coupled to expander turbine 7 via gear reduction coupling 19. The gear reduction in this case is 4:1. Effluent from the compressor 17 proceeds via line 28 at 100° F. through heat exchanger 11 and emerges at 260 psig and 30° F. at 2800 MPH. Line 21 carries the feedstock to the plant (e.g., to the suction of the main feedgas compressor (not shown) for compression to process pressure). At 22 is shown a valve which opens to receive natural gas feed into the turbine expander and heat exchanger, for the fuel gas line. Valve 24 opens to receive feed stock into the compression and heat exchanger system. Valve 26 is closed during operation of the invention. It may be opened if it be desired to take a stream of natural gas at feed conditions without going through the process of this invention; similarly, at 30 is shown a bypass fuel gas line, used when some, or all of the fuel gas stream bypasses the expander 7.

The aforesaid division of the feed stream into fuel gas at 2300 MPH and feed stock at 2800 MPH gives a 0.82:1 split, or roughly 45:55. Other fuel:feed ratios are operable, e.g., about 0.3 to 1.5:1. The ratio is, of course, the same whether measured by moles, weight, or volume.

In a typical ammonia plant where this invention would be useful, the plant conventionally (i.e., not using this invention) reduces the fuel gas pressure through a control valve from 200 to 50 psig. The feedstock gas is fed to a 2800 Hp steam turbine driven centrifugal compressor where the pressure is boosted from 200 to 600 psig. However, with currently available machinery and equipment, by expanding the fuel gas through a turbine-type expander, in the process of this invention, approximately 500 horsepower can be recovered, which in turn can be used to partially compress the feedstock portion of the natural gas to about 265 psig. As described, the discharge heat exchanger further reduces the main feedgas compressor horsepower requirement in such plant by chilling the feed and reducing the inlet volume. Also, heating the fuel gas portion conserves energy. The net result is a savings of about 25% of the main feedgas compressor energy, or about 6,500 lbs/hr of steam.

In the general application of the invention, the feedstock and fuel gas temperatures may be lower or higher than the supply temperature, depending on gas supply conditions and process and fuel pressure requirements. In any event, the expander/compressor discharge exchanger shown in the drawing conserves energy by heating the fuel stream, thus increasing its heat content, and cooling the feedstock stream, thus reducing its volume, which in turn reduces the load on the main feedstock compressor.

Another variation of this invention is to use part or all of the hot compressor discharge (feedstock gas) to heat the inlet to the expander. This causes more energy to be available from the expander. Also, preheating the expander inlet could be used to prevent the expander discharge from exceeding −20° F., the metallurgical temperature limit for safe design of normal carbon steel.

Another variation of this invention is to perform the expansion and/or compression in more than one stage with heat interchange between each stage. The purpose of this arrangement would be to limit the expander discharge, say to minus 20° F. and/or to provide compressor stage intercooling for more efficient compression.

In general, regardless of the composition of the initial stream, the following conditions are preferred: the initial stream is at a temperature of about 20° to 150° F. and at a pressure of about 100 to 1000 psia; the effluent leaving the turbine is at a pressure of about 25 psia or above and at a temperature of minus 200° F. or above;

and the stream leaving the compressor is at a pressure of about 120 to 12,000 psia and at a temperature of about 40° F. or above, the upper temperature limit in keeping with good compressor design practice. Furthermore, when the heat exchange embodiment is used, it is preferred that the effluent from the turbine as it leaves the heat exchanger be at a pressure of about 25 psia or above and at a temperature of about minus 200° F. or above; and the effluent from the compressor as it leaves the heat exchanger be at a pressure of about 120 to 12,000 psia and at a temperature of about minus 190° to 390° F.

More specifically preferred conditions are: the initial stream is at a temperature of about 60° F. and at a pressure of about 200 psig; the ratio of the first to second streams is about 45:55, the effluent leaving the turbine is at a pressure of about 55 psig and at a temperature of about minus 10° F.; the stream leaving the compressor is at a pressure of about 265 psig and at a temperature of about 100° F.; the effluent from the turbine as it leaves the heat exchanger is at a pressure of about 50 psig and at a temperature of about 75° F.; and the effluent from the compressor as it leaves the heat exchanger is at a pressure of about 260 psig and at a temperature of about 30° F.

I claim:

1. The method of forming an initial gas stream at a pressure above atmospheric pressure which is to be used as both a fuel gas and as a feedstock stream for a chemical process into a first fuel stream of lower pressure and a second feedstock stream of higher pressure, comprising
   (1) dividing the initial stream into a first fuel stream and a second feedstock stream;
   (2) charging the first stream to an expander turbine coupled to a compressor and recovering this first stream as a fuel stream at lower pressure; and
   (3) compressing the second stream with the compressor and recovering this second stream as a feedstock stream for a chemical process at higher pressure than the pressure of the initial gas,
whereby a portion of the initial gas being used as a feedstock stream for a chemical process is converted to a higher pressure than the pressure of the initial gas.

2. Method according to claim 1 comprising the additional step of passing the turbine effluent and the compressed second stream through a heat exchanger in indirect heat exchange relationship whereby the compressed second feedstock stream warms the first fuel stream exiting as the turbine effluent and is itself cooled by it, thereby to provide the first fuel stream at higher temperature than the expander discharge temperature and at lower pressure than the initial stream and the second feedstock stream at a lower temperature than the compressor discharge temperature and at higher pressure than the initial stream.

3. The method according to claim 2 comprising forming an initial natural gas stream into a fuel stream of lower pressure and a reforming feedstock stream of higher pressure, comprising
   (1) dividing the initial stream into a first stream intended as fuel gas and a second stream intended as feed stock, in a ratio of about 0.3 to 1.5:1;
   (2) charging the first stream to an expander turbine coupled to a compressor;
   (3) compressing the second stream with the compressor;
   (4) passing the turbine effluent and the compressed second stream through a heat exchanger in indirect heat exchange relationship whereby the compressed second stream warms the turbine effluent and is itself cooled by it, thereby to provide the first stream as a fuel stream at higher temperature than the expander discharge and lower pressure than the initial stream and the second stream as a reforming feedstock stream at a lower temperature than the compressor discharge and higher pressure than the initial stream.

4. Method according to claim 3 in which the initial stream is at a temperature of about 20° to 150° F. and at a pressure of about 100 to 1000 psia; the effluent leaving the turbine is at a pressure of at least about 25 psia and at a temperature of at least about minus 200° F.; the stream leaving the compressor is at a pressure of about 120 to 12,000 psia and at a temperature of at least about 40° F.; the effluent from the turbine as it leaves the heat exchanger is at a pressure of at least about 25 psia and at a temperature of at least about minus 200° F.; and the effluent from the compressor as it leaves the heat exchanger is at a pressure of about 120 to 12,000 psia and at a temperature of at least about minus 190° F.

5. Method according to claim 4 in which the initial stream is at a temperature of about 60° F. and at a pressure of about 200 psig; the ratio of the first to second streams is about 45:55, the effluent leaving the turbine is at a pressure of about 55 psig and at a temperature of about minus 10° F.; the stream leaving the compressor is at a pressure of about 265 psig and at a temperature of about 100° F.; the effluent from the turbine as it leaves the heat exchanger is at a pressure of about 50 psig and at a temperature of about 75° F.; and the effluent from the compressor as it leaves the heat exchanger is at a pressure of about 260 psig and at a temperature of about 30° F.

* * * * *